(12) United States Patent
Arndt et al.

(10) Patent No.: US 7,870,406 B2
(45) Date of Patent: Jan. 11, 2011

(54) METHOD AND APPARATUS FOR FREQUENCY INDEPENDENT PROCESSOR UTILIZATION RECORDING REGISTER IN A SIMULTANEOUSLY MULTI-THREADED PROCESSOR

(75) Inventors: Richard Louis Arndt, Austin, TX (US); Balaram Sinharoy, Poughkeepsie, NY (US); Scott Barnett Swaney, Catskill, NY (US); Kenneth Lundy Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1744 days.

(21) Appl. No.: 11/050,325

(22) Filed: Feb. 3, 2005

(65) Prior Publication Data
US 2006/0173665 A1 Aug. 3, 2006

(51) Int. Cl.
*G06F 1/00* (2006.01)
(52) U.S. Cl. .................................................. 713/322
(58) Field of Classification Search .................. 713/300, 713/322
See application file for complete search history.

(56) References Cited

U.S. PATENT DOCUMENTS

| | | | | |
|---|---|---|---|---|
| 6,549,930 | B1 * | 4/2003 | Chrysos et al. | 718/104 |
| 7,472,390 | B2 * | 12/2008 | O'Connor et al. | 718/104 |
| 7,707,578 | B1 * | 4/2010 | Zedlewski et al. | 718/102 |
| 2001/0056456 | A1 * | 12/2001 | Cota-Robles | 709/103 |
| 2004/0216120 | A1 * | 10/2004 | Burky et al. | 718/107 |
| 2005/0210472 | A1 * | 9/2005 | Accapadi et al. | 718/105 |

* cited by examiner

*Primary Examiner*—Thomas Lee
*Assistant Examiner*—Mohammed H Rehman
(74) *Attorney, Agent, or Firm*—Yee & Associates, P.C.; Matthew W. Baca

(57) ABSTRACT

Mechanism for accurately measuring useful capacity of a processor allocated to each thread in a simultaneously multi-threading data processing system. Instructions dispatched from multiple threads are executed by the processor on a same clock cycle. A determination is made whether Time Base (TB) register bit (60) is changing. A dispatch charge value is determined for each thread, and added to the Processor Utilization Resource Register for each thread when TB bit (60) changes.

21 Claims, 6 Drawing Sheets

| THREAD 0 | THREAD 1 | THREAD 0 | THREAD 1 |
|---|---|---|---|
| D0 | D1 | CHARGE | CHARGE |
| 0 | 0 | PREVIOUS | PREVIOUS |
| 1 | 0 | 1000 | 0000 |
| 2 | 0 | 1000 | 0000 |
| 3 | 0 | 1000 | 0000 |
| 4 | 0 | 1000 | 0000 |
| 5 | 0 | 1000 | 0000 |
| 0 | 1 | 0000 | 1000 |
| 1 | 1 | 0100 | 0100 |
| 2 | 1 | 0101 | 0011 |
| 3 | 1 | 0110 | 0010 |
| 4 | 1 | 0110 | 0010 |
| 5 | 1 | 0111 | 0001 |
| 0 | 2 | 0000 | 1000 |
| 1 | 2 | 0011 | 0101 |
| 2 | 2 | 0100 | 0100 |
| 3 | 2 | 0101 | 0011 |
| 4 | 2 | 0101 | 0011 |
| 5 | 2 | 0110 | 0010 |
| 0 | 3 | 0000 | 1000 |
| 1 | 3 | 0010 | 0110 |
| 2 | 3 | 0011 | 0101 |
| 3 | 3 | 0100 | 0100 |
| 4 | 3 | 0101 | 0011 |
| 0 | 4 | 0000 | 1000 |
| 1 | 4 | 0010 | 0110 |
| 2 | 4 | 0011 | 0101 |
| 3 | 4 | 0011 | 0101 |
| 0 | 5 | 0000 | 1000 |
| 1 | 5 | 0001 | 0111 |
| 2 | 5 | 0010 | 0110 |

*FIG. 4*

METHOD AND APPARATUS FOR
FREQUENCY INDEPENDENT PROCESSOR
UTILIZATION RECORDING REGISTER IN A
SIMULTANEOUSLY MULTI-THREADED
PROCESSOR

BACKGROUND OF THE INVENTION

1. Technical Field

The present invention relates to an improved data processing system. More specifically, the present invention is directed to a method, apparatus, and computer program product for accurately measuring the useful processor capacity allocated to each thread in a dual-threaded simultaneously multi-threaded processor, where instructions from multiple threads may be dispatched on the same cycle, within a data processing system which allows dynamic variation of processor frequency to optimize performance and temperature.

2. Description of Related Art

A symmetric multiprocessing (SMP) data processing system has multiple processors that are symmetric such that each processor has the same processing speed and latency. An SMP system may be logically partitioned to have one or more operating systems that divide the work into tasks that are distributed evenly among the various processors by dispatching programs to each processor.

Modern micro-processors are usually superscalar, which means a single processor can decode, dispatch, and execute multiple instructions each processor cycle. These modern processors may also support simultaneous multi-threading (SMT), which means each processor can concurrently execute more than one software program (thread) at a time. An SMT processor typically has the ability to favor one thread over another when both threads are running on the same processor. Each thread is assigned a hardware-level priority by the operating system, or the hypervisor in a logically partitioned environment. Within each processor, the thread that has the highest priority will be granted more decode units and more dispatch cycles, thereby making more resources available to that thread. Therefore, the higher priority thread will use more of the processor's resources and as a result do more work than the lower priority sibling threads on the same processor.

One use for hardware thread priority has been the voluntarily lowering of thread priority when the importance of the work was known to be less than work being done by the other threads. For example, if one thread being executed by a processor was idle, the operating system might voluntarily lower its priority to permit the other threads being executed by the same processor access to more of the processor's resources.

When a high priority thread is not able to use all the allocated resources on a given processor cycle due to a cache miss, lower priority threads are permitted to use whatever resources that are not consumed by the higher priority thread. Different programs have different memory and cache access characteristics, and thus encounter different stalls due to cache misses. Thus, the total processing capacity actually utilized by each thread does not necessarily track with the assigned thread priority. For example, if a high priority thread encounters frequent cache misses, a lower priority thread will be allowed to utilize more of the processor resource than if the high priority thread does not encounter cache misses.

Time is important for managing the available processing resources. The number of active tasks or programs in a large SMP system may exceed the total number of hardware threads across all the processors in the system, which means not all of the programs can execute at the same time. The operating system (and hypervisor in a logically partitioned system) allocates portions of time to different sets of tasks or programs, with different durations (time slices) allocated to different tasks depending on the priority and resources required for each task.

A Time Base (TB) Register is used to represent time in a processor. The TB is a free-running 64-bit register that increments at a constant rate so that its value can be converted to time. The TB registers are synchronized across all processors in an SMP system so that all processors in the system have the same representation of time. The TB is a shared resource across all threads, and the constant rate that it increments is known to software executing on each thread. Software calculates time by multiplying the TB value by the known incrementing rate, and adding the result to a known time offset.

In prior designs, the processor clock frequency was a known constant, so the TB could simply increment every 'n' processor cycles, where 'n' is set depending on the desired granularity of time increment. For example, at a processor frequency of 1.0 GHz, with n=8, a TB value of '000000001234ABCD'x represents 2.4435 seconds.

In order to manage time slices and thread priority most effectively, the operating system must know the portion of a processor's resource capacity that is actually consumed by each thread. A Processor Utilization Resource Register (PURR) was introduced to measure the portion of processor capacity consumed by each thread. Each thread in the processor has a PURR. Logic in the processor calculates the fraction of instruction dispatch capacity allocated to each thread, which is an adequate measure of overall consumed processor capacity, and accumulates this "charge" to the PURR for each thread.

In prior designs, only instructions from the same thread could be dispatched on the same processor cycle, and thread priority was managed by allocating more or fewer dispatch cycles to each thread. The processor utilization "charge" for each thread was accumulated to each thread's PURR value, and was implemented as simply counting processor cycles which dispatched instructions from each thread. On cycles where no instructions were dispatched, for example when two threads encounter cache misses at the same time, the cycle was charged to which ever thread most recently had a prior dispatch cycle.

The TB is used in conjunction with the PURR. In the prior art, since the TB counted processor cycles, and the PURR registers across all threads counted dispatch cycles for each thread, the sum of the PURR values across all threads was always equal to the TB value multiplied by the number of cycles between increments of the TB. The fixed processor cycle relationship between the TB and PURR allowed software to calculate the accumulated charge for its thread to be calculated from the TB and PURR for its own thread, without requiring the PURR value for the other thread. This is a requirement because software executing on one thread does not have access to other thread's dedicated resources.

One significant limitation in known SMT systems is that they do not support dynamic variation of processor frequency. Today's processors must operate in an environment where the frequency is adjusted dynamically during steady-state operation in order to optimize power consumption and operating temperature. Wall-clock time cannot be calculated from a cycle counter if the cycle period is not known or fixed. Hence, the TB register can no longer be implemented as a cycle counter. Without the fixed cycle relationship between TB and PURR, software cannot determine the portion of processor utilization from only the TB and the PURR for its own thread.

A possible alternate solution involves sharing thread-specific resources across threads, which is architecturally undesirable, and requires a different algorithm for calculating the utilization which breaks downward software compatibility. Another undesirable solution is to modify the "known" cycle period and base time offset every time the frequency is changed. However, it is difficult to precisely control the process of modifying the "known" cycle period and base time offset every time the frequency is changed, and will result in accumulating inaccuracy. This modification process will also impact performance and the ability to optimize the operating frequency.

Another limitation of the prior art is that determining the utilization charge by simply counting dispatch cycles for each thread does not allow instructions from multiple threads to be dispatched on the same processor cycle. Overall processor throughput is improved if instructions from lower priority threads can be dispatched during the same cycle as a higher priority thread if the higher priority thread is not able to utilize all the available processor resources that cycle. In order to accurately represent the portion of a processor's resources allocated to a thread, where instructions from multiple threads are dispatched on the same cycle, the calculation of the charge for each thread must take into account the portion of the total resources allocated to each thread each cycle.

Therefore, it would be advantageous to have a technique for accurately measuring the useful processor capacity allocated to each thread in a simultaneously multi-threaded processor, where instructions from multiple threads may be dispatched on the same cycle, within a data processing system which allows dynamic variation of processor frequency to optimize performance and temperature.

SUMMARY OF THE INVENTION

A method, apparatus, and computer program product are disclosed for accurately measuring the useful processor capacity allocated to each thread in a simultaneously multi-threading (SMT) processor in a data processing system, where instructions from multiple threads may be dispatched on the same cycle, and which also allows dynamic variation of processor frequency to optimize performance and temperature.

According to a preferred embodiment, the present invention samples the dispatch charge for each thread to measure the portion of useful capacity allocated to each thread in a dual-threaded SMT processor. The dual-threaded SMT processor can dispatch up to seven total instructions across both threads each cycle, with up to five instructions being from the same thread. The sampling of the dispatch charge is related to the incrementing of the TB so that the processor may be used in a data processing system with one or many processors which dynamically varies processor frequency to optimize performance and temperature.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a table showing all possible combinations of instruction dispatch combinations and associated charge calculation in accordance with a preferred embodiment of the present invention;

DETAILED DESCRIPTION OF THE PREFERRED EMBODIMENT

The present invention is a method, apparatus, and computer program product for accurately measuring the useful processor capacity allocated to each thread in a dual-threaded simultaneously multi-threaded processor, where instructions from multiple threads may be dispatched on the same cycle, within a data processing system which also allows dynamic variation of processor frequency to optimize performance and temperature.

A simultaneous multi-threading (SMT) processor is capable of concurrently executing multiple different programs, or threads. Each thread is assigned an SMT hardware thread priority. When the processor is executing multiple threads, the processor determines what priority is currently assigned to each thread and then favors the thread with the higher priority by granting to that thread more decode, dispatch, and execution resources.

Figure 1:
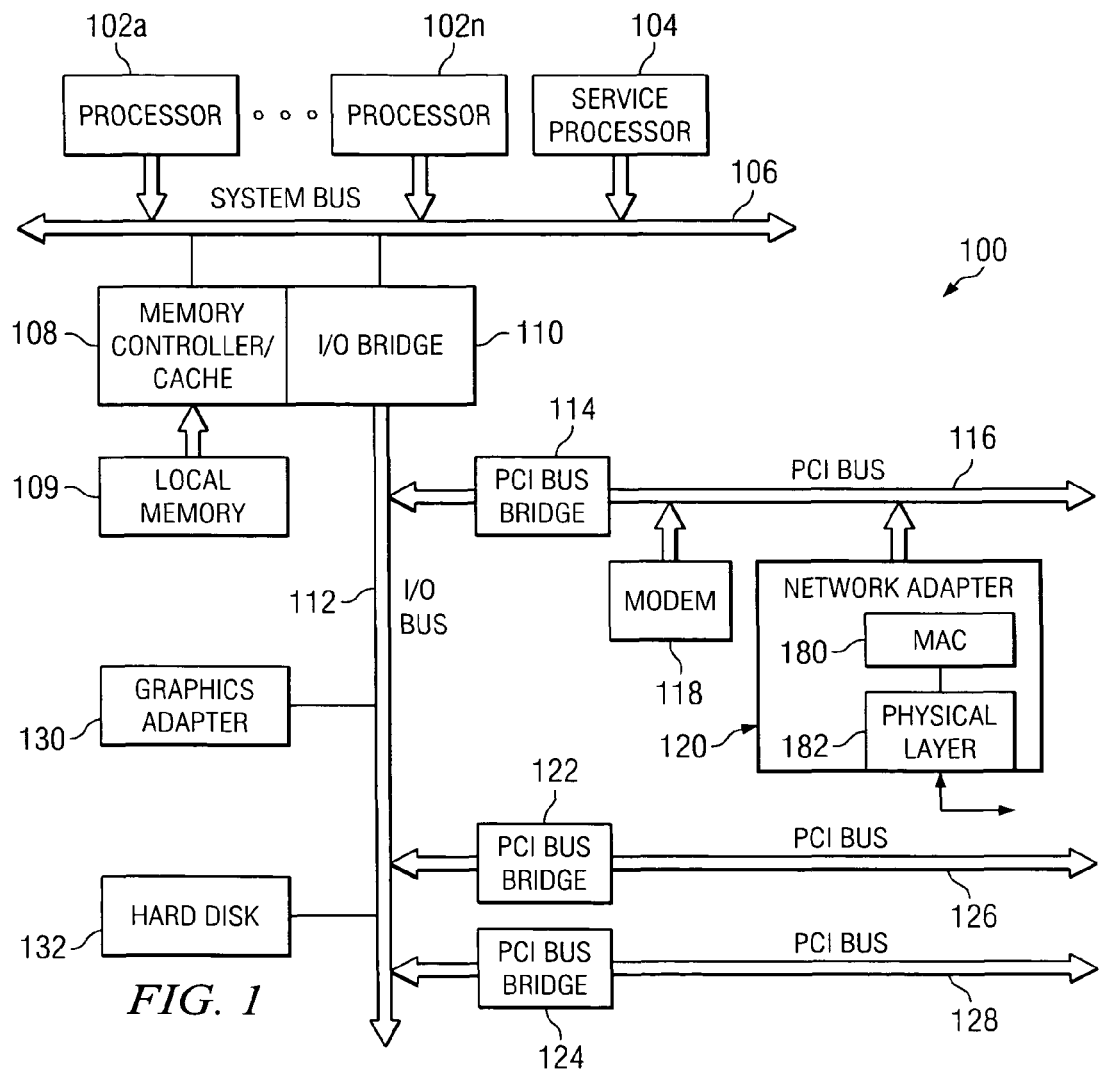
FIG. 1 is an exemplary block diagram of a data processing system in which the present invention may be implemented.

With reference now to the figures, FIG. 1 an exemplary block diagram of a data processing system in which the present invention may be implemented is depicted. Data processing system 100 may be a symmetric multiprocessor (SMP) system including a plurality of SMT-capable processors 102a-102n connected to System Bus 106. Alternatively, a single processor system may be employed. All of the processors described herein with reference to all of the figures are superscalar, SMT-capable processors. Each superscalar, SMT-capable processor is capable of concurrently executing multiple threads on the one processor with varied amount of resources allocated to each thread. Further, each thread will have assigned to it a hardware priority that the processor will use when determining what and how many of the superscalar resources and processing cycles to grant to a particular thread.

Also connected to System Bus 106 is Memory Controller/Cache 108, which provides an interface to Local Memory 109. Input/Output (I/O) Bus Bridge 110 is connected to System Bus 106 and provides an interface to I/O Bus 112. Memory Controller/Cache 108 and I/O Bus Bridge 110 may be integrated as depicted.

Peripheral Component Interconnect (PCI) Bus Bridge 114 connected to I/O Bus 112 provides an interface to PCI Local Bus 116. A number of modems may be connected to PCI Bus 116. Typical PCI Bus implementations will support four PCI expansion slots or add-in connectors. Communications links to network computers may be provided through Modem 118 and Network Adapter 120 connected to PCI Local Bus 116 through add-in boards.

Network Adapter 120 includes a Physical Layer 182 which conditions analog signals to go out to the network, such as for example an Ethernet network over an R45 connector. A Media Access Controller (MAC) 180 is included within Network Adapter 120. MAC 180 is coupled to Bus 116 and processes digital network signals. MAC 180 serves as an interface between Bus 116 and Physical Layer 182. MAC 180 performs a number of functions involved in the transmission and reception of data packets. For example, during the transmission of data, MAC 180 assembles the data to be transmitted into a packet with address and error detection fields. Conversely, during the reception of a packet, MAC 180 disassembles the packet and performs address checking and error detection. In addition, MAC 180 typically performs encoding/decoding of digital signals transmitted and performs preamble generation/removal as well as bit transmission/reception.

Additional PCI Bus Bridges 122 and 124 provide interfaces for additional PCI Buses 126 and 128, from which additional modems or network adapters may be supported. In this manner, data processing system 100 allows connections to multiple network computers. A memory-mapped Graphics Adapter 130 and Hard Disk 132 may also be connected to I/O Bus 112 as depicted, either directly or indirectly.

Service Processor 104 interrogates system processors, memory components, and I/O bridges to generate an inventory and topology understanding of data processing system 100. Service Processor 104 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by Service Processor 104.

System Bus 106 can be connected to one or more like system busses which allows the data processing system to be incrementally scaled up to a large n-way SMP.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention. The data processing system depicted in FIG. 1 may be, for example, an IBM e-Server pSeries system, a product of International Business Machines Corporation in Armonk, N.Y., running the Advanced Interactive Executive (AIX) operating system or LINUX operating system.

Figure 2:
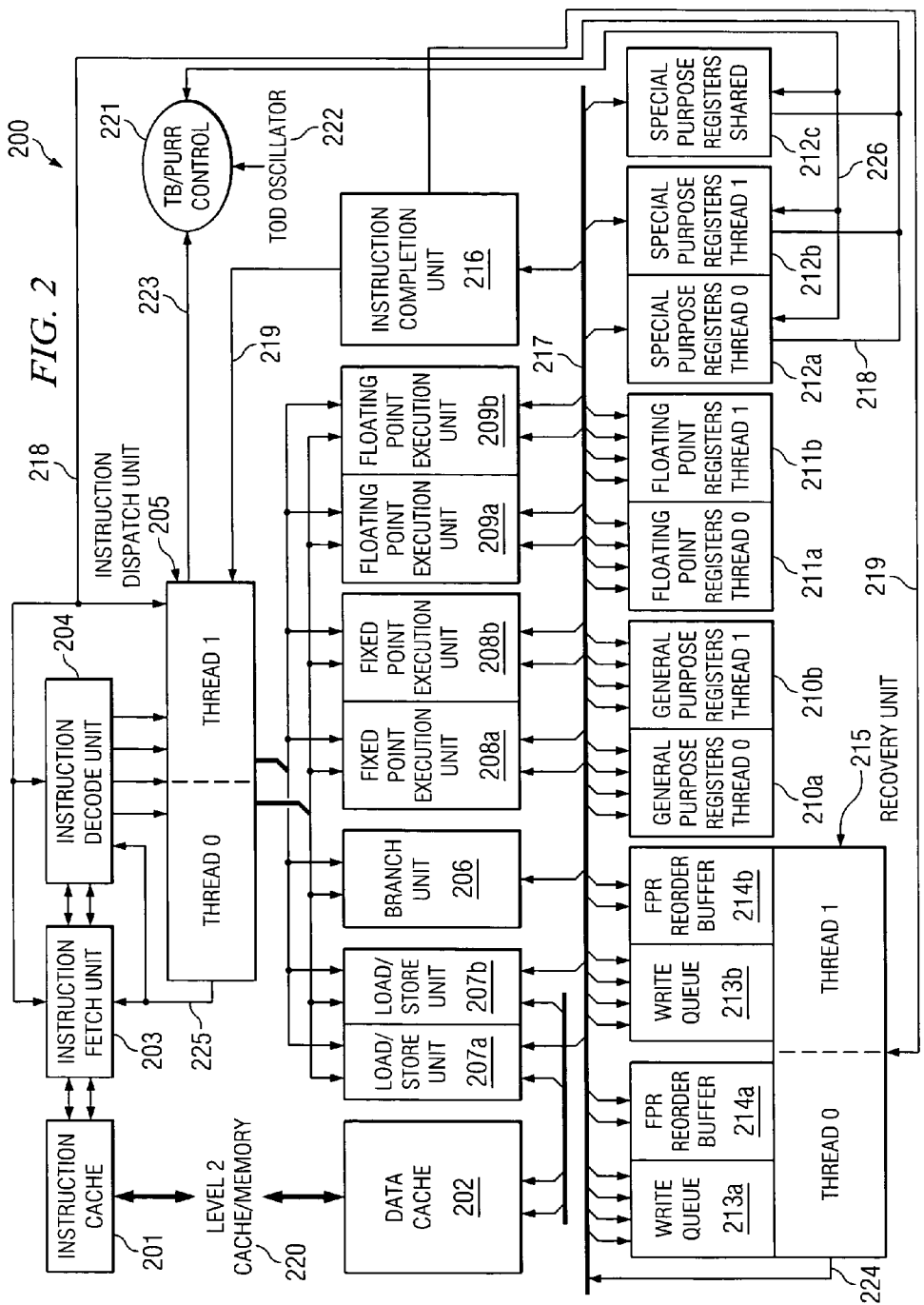
FIG. 2 is an exemplary block diagram of a dual threaded processor design showing functional units and registers in accordance with a preferred embodiment of the present invention.

Referring to FIG. 2, an exemplary block diagram of a dual threaded processor design showing functional units and registers in accordance with a preferred embodiment of the present invention is shown. The processor is generally designated by reference number 200, and may be implemented as one of processors 102a-102n in FIG. 1. Processor 200 comprises a single integrated circuit superscalar microprocessor with dual-thread SMT. Accordingly, as discussed further herein below, processor includes various units, registers, buffers, memories, and other sections, all of which are formed by integrated circuitry. Also, in a preferred embodiment of the present invention, processor 200 operates according to reduced instruction set computer ("RISC") techniques.

As shown in FIG. 2, Instruction Fetch Unit 203 (IFU) is connected to Instruction Cache 201. Instruction Cache 201 holds instructions for multiple programs (threads) to be executed. Instruction Cache 201 also has an interface to Level 2 Cache/Memory 220. IFU 203 requests instructions from Instruction Cache 201 according to an instruction address, and passes instructions to Instruction Decode Unit 204. In a preferred embodiment of the present invention, IFU 203 can request multiple instructions from Instruction Cache 201 for up to two threads at the same time. Instruction Decode Unit 204 decodes multiple instructions for up to two threads at the same time and passes decoded instructions to Instruction Dispatch Unit 205 (IDU). IDU 205 selectively groups decoded instructions from Instruction Decode Unit 204 for each thread, and outputs a group of instructions for each thread to execution circuitry 206, 207a, 207b, 208a, 208b, 209a, and 209b of the processor.

In a preferred embodiment of the present invention, the execution circuitry of the processor may include, Branch Unit 206, Fixed-Point Execution Units 208a (FXUA) and 208b (FXUB), Load/Store Units 207a (LSUA) and 207b (LSUB), and Floating-Point Execution Units 209a (FPUA) and 209b (FPUB). Execution units 206, 207a, 207b, 208a, 208b, 209a, and 209b are fully shared across both threads. The processor includes multiple register sets 210a, 210b, 211a, 211b, 212a, 212b, and 212c separately for each of the two threads, namely General Purpose Registers 210a and 210b (GPR), Floating-Point Registers 211a and 211b (FPR), and Special Purpose Registers 212a and 212b (SPR). The processor additionally includes a set of SPRs 212c which is shared across both threads. Simplified internal bus structure 217 is shown to depict connections between execution units 206, 207a, 207b, 208a, 208b, 209a, and 209b and register sets 210a, 210b, 211a, 211b, 212a, 212b, and 212c.

FPUA 209a and FPUB 209b input their register source operand information from and output their destination register operand data to FPRs 211a and 211b according to which thread each executing instruction belongs to. FXUA 208a, FXUB 208b, LSUA 207a, and LSUB 207b input their register source operand information from and output their destination register operand data to GPRs 210a and 210b according to which thread each executing instruction belongs to. A subset of instructions executed by FXUA 208a, FXUB 208b, and Branch Unit 206 use SPRs 212a, 212b and 212c as source and destination operand registers. LSUA 207a and LSUB 207b input their storage operands from and output their storage operands to Data Cache 202 which stores operand data for multiple programs (threads). Data Cache 202 also has an interface to Level 2 Cache/Memory 220.

In response to the instructions input from Instruction Cache 201 and decoded by Instruction Decode Unit 204, IDU 205 selectively dispatches the instructions to execution units 206, 207a, 207b, 208a, 208b, 209a, and 209b. Execution units 206, 207a, 207b, 208a, 208b, 209a, and 209b execute one or more instructions of a particular class of instructions. For example, FXUA 208a and FXUB 208b execute fixed-point mathematical operations on register source operands, such as addition, subtraction, ANDing, ORing and XORing. FPUA 209a and FPUB 209b execute floating-point mathematical operations on register source operands, such as floating-point multiplication and division. LSUA 207a and LSUB 207b execute load and store instructions which move operand data between Data Cache 202 and registers 210a, 210b, 211a, and 211b. Branch Unit 206 executes branch instructions which conditionally alter the flow of execution through a program by modifying the instruction address used by IFU 203 to request instructions from Instruction Cache 201.

IDU 205 groups together decoded instructions to be executed at the same time, depending on the mix of decoded instructions and available execution units 206, 207a, 207b, 208a, 208b, 209a, and 209b to perform the required operation for each instruction. For example, because there are only two Load/Store Units 207a and 207b, a maximum of two Load/Store type instructions may be grouped together. In a preferred embodiment of the present invention, up to seven instructions may be grouped together (two Fixed-Point arithmetic, two Load/Store, two Floating-Point arithmetic, and one Branch), and up to five instructions may belong to the same thread. IDU 205 includes in the group as many instructions as possible from the higher priority thread, up to five, before including instructions from the lower priority thread. Values in Special Purpose Registers 212a and 212b indicate thread priority 218 to IDU 205.

Instruction Completion Unit 216 monitors internal bus structure 217 to determine when instructions executing in execution units 206, 207a, 207b, 208a, 208b, 209a, and 209b are finished writing their operand results. Instructions executed by Branch Unit 206, FXUA 208a, FXUB 208b, LSUA 207a, and LSUB 207b require the same number of cycles to execute, while instructions executed by FPUA 209a and FPUB 209b require a variable, and a larger number of cycles to execute. Therefore, instructions which are grouped together and start executing at the same time do not necessarily finish executing at the same time. When all the instructions grouped together within a thread are finished writing their operand results, the group is said to be "completed".

Instruction Completion Unit 216 monitors for the completion of instruction, and sends control information 219 to IDU 205 to identify that more groups of instructions can be dispatched to execution units 206, 207a, 207b, 208a, 208b, 209a, and 209b. IDU 205 sends control information 225 to IFU 203 and Instruction Decode Unit 204 to indicate that it is ready to receive more decoded instructions.

Processor 200 preferably also includes error detection circuitry (not shown on FIG. 2) throughout all functional units, and Recovery Unit 215 which contains a backup copy of registers 210a, 210b, 211a, 211b, 212a, 212b, and 212c for both threads. Results written to register sets 210a, 210b, 211a, 211b, 212a, 212b, and 212c are also written to queue structures 213a, 213b, 214a, and 214b over internal bus structure 217. Register results from Branch Unit 206, FXUA 208a, FXUB 208b, LSUA 207a, and LSUB 207b are held in Write Queue 213a and 213b according to which thread the associated instruction belongs to. Write Queue 213a and 213b for each thread is a simple First-In-First-Out (FIFO) queue structure. Because instructions executed by FPUA 209a and FPUB 209b require a variable, and a larger number of cycles to execute, these results are written to FPR Reorder Buffer 214a and 214b according to which thread the associated instruction belongs to. FPR Reorder Buffer 214a and 214b arranges for each thread the results from FPUA 209a and FPUB 209b in the sequence which the associated instructions occurred in the program originally supplied by Instruction Cache 201.

The register results are held in Write Queue 213a and 213b and FPR Reorder Buffer 214a and 214b for each thread until Completion Unit 216 indicates (via control 219) that all instructions in the group have completed for each thread. If no errors are reported by the error detection circuitry (not shown in FIG. 2), the results are drained from queue structures 213a, 213b, 214a, and 214b into the backup copy of the associated registers in Recovery Unit 215. In the event of an error, Recovery Unit 215 discards the contents of Write Queue 213a and 213b and FPR Reorder Buffer 214a and 214b for each thread, and restores the backup copy of register sets 210a, 210b, 211a, 211b, 212a, 212b, and 212c using internal bus structure 217. Processing may then be resumed from the known error-free instruction boundary.

Some of SPRs 212a, 212b, and 212c hold information used to control the operation of the various functional units. This is represented, simplified, in FIG. 2 by connection 218. SPRs 212a and 212b have separate copies for each thread, while 212c is shared across all threads. Not limited to these examples, SPRs 212a, 212b, and 212c may include instruction addresses, thread priority control, condition code, save/restore addresses, machine state, et cetera.

Two SPRs specifically related to this present invention are Time Base (TB) SPR 212c and Processor Utilization Resource Register (PURR) SPR 212a and 212b. TB SPR 212c is shared across all threads in a multi-threaded processor, such as multi-threaded processor 200, and is synchronized across all processors, such as processors 102a-102n in FIG. 1. TB SPR 212c is used to represent time and is a free-running 64-bit register that increments at a constant rate so that its value can be converted to time. PURRs SPR 212a and 212b are separate for each thread and are used to monitor the portion of processor resource allocated to each thread in multi-threaded processors 102a-102n in FIG. 1. PURRs SPR 212a and 212b are also 64-bit registers.

In addition to instructions executed by FXUA 208a and FXUB 208b, TB SPR 212c and PURR SPR 212a and 212b values are also modified by TB/PURR Control Logic 221 which receives dispatch information 223 from IDU 205, and processor frequency independent Time-of-Day (TOD) Oscillator 222. TB/PURR Control 221 is described in detail below with reference to FIGS. 3-6.

In order to optimize performance and temperature in a SMT processor, it is necessary to dynamically change the processor clock frequency since higher operating frequencies cause the circuitry to consume more power and dissipate more heat. If the processor frequency is not a constant, then TB SPR 212c value which counts processor cycles cannot be converted to real time. In order to represent real time, TB SPR 212c operation is modified to increment from sampling fixed frequency oscillator 222 which is independent from the processor clock.

In a preferred embodiment of the present invention, stable Time-of-Day (TOD) oscillator 222 is provided independently from the oscillator used to clock the processor circuits. Stable TOD oscillator 222 has a slow frequency (32 MHz) relative to the processor clock frequency, as it must be distributed throughout SMP system 100 of FIG. 1. The slow frequency allows the logic on the processor to easily sample the edges of incoming TOD oscillator 222 across the entire dynamic frequency range of the processor. The processor logic samples the rising edge of TOD oscillator 222 to increment TB SPR 212c.

In order to provide higher granularity of TB SPR 212c, stable TOD oscillator 222 is associated with bit (59) of 64-bit TB SPR 212c. The low-order bits (60:63) of TB SPR 212c are used for added precision by continuing to count processor cycles, but they are not for accuracy. Because TB bits (60:63) are incremented by a counter which counts processor cycles, the process is not completely independent of processor frequency. These bits increment from a programmable number of processor clock cycles, but saturate at a value of '1111'b, and clear whenever TB bits (0:59) are incremented from stable TOD oscillator 222.

Figure 3:
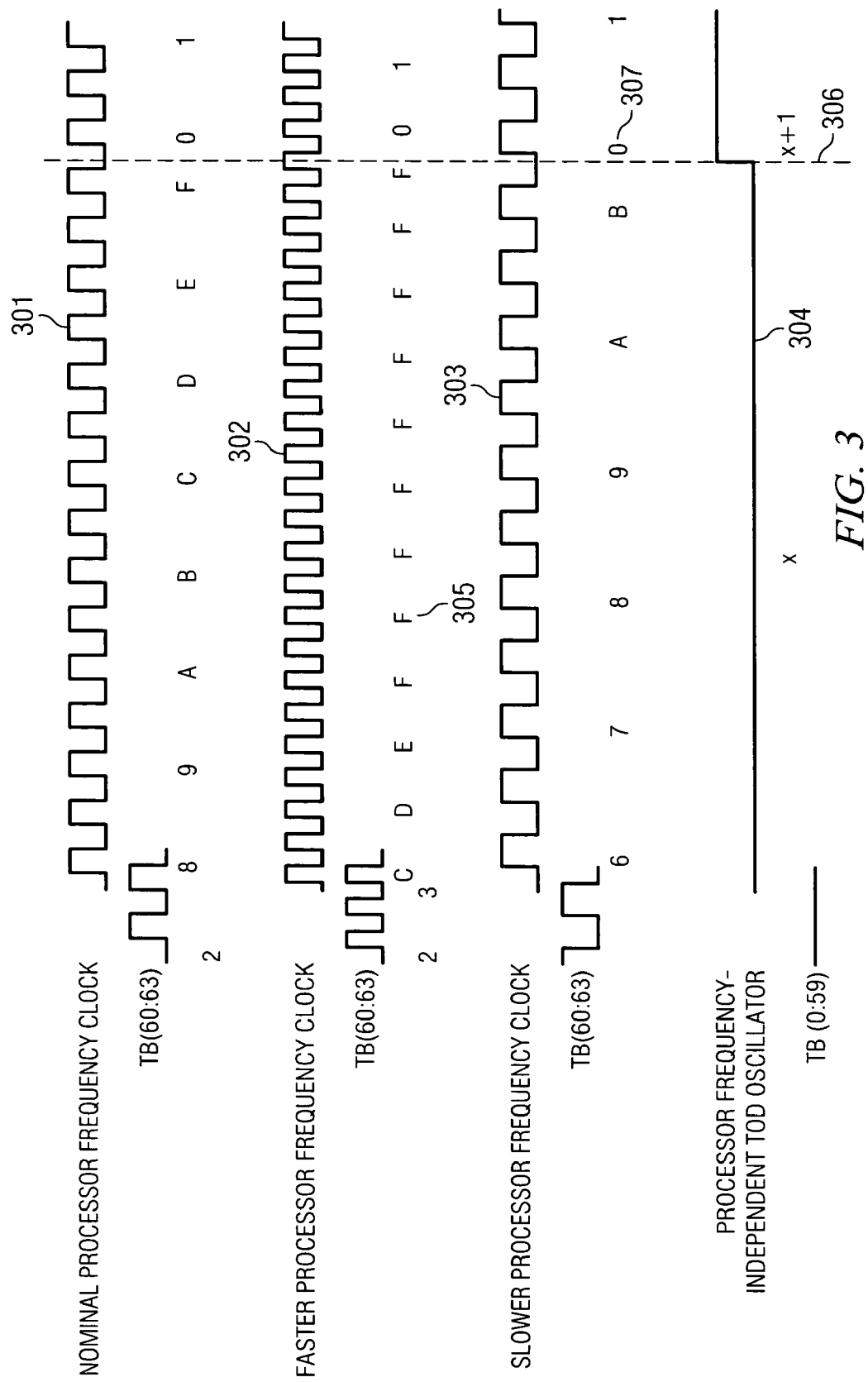
FIG. 3 is a timing diagram illustrating Time Base (TB) Register behavior at different processor clock frequencies and the processor frequency independent Time-of-Day (TOD) Oscillator in accordance with a preferred embodiment of the present invention.

With reference to FIG. 3, a timing diagram of TB Register's (SPR 212c of FIG. 2) behavior at different processor clock frequencies and processor frequency independent Time-of-Day (TOD) Oscillator 222 of FIG. 2 in accordance with a preferred embodiment of the present invention is shown. FIG. 3 illustrates the affect on TB SPR 212c of FIG. 2 of varying the processor frequency where TB bits (60:63) are set to increment every n=2 processor cycles. At all frequencies, TB bits (60:63) are cleared and TB bits (0:59) are incremented on rising edge 306 of processor frequency-independent TOD oscillator 304. At nominal frequency 301, the value of TB bits (60:63) increment through all possible values. At faster frequency 302, the value of TB bits (60:63) saturate at 'F'x 305 for several intervals before rising edge of TOD oscillator 306. At slower frequency 303, the value of TB bits (60:63) are truncated 307 by rising edge of TOD oscillator 306 before ever reaching a value of 'F'x.

Dynamically changing the processor clock frequency does introduce inaccuracy in low-order bits (60:63), as the value will be "truncated" by rising edge of TOD oscillator 306 at slower frequencies, but will saturate at '1111'b until the next rising edge of TOD oscillator 306 at faster frequencies. This "jitter" in the low-order bits will not accumulate, as the TB value is continuously corrected to bit (59) by stable TOD oscillator 222 of FIG. 2, and is small enough to not adversely affect software which uses TB SPR 212c of FIG. 2.

TOD oscillator 222 of FIG. 2 could instead be associated with low-order bit(63) of TB SPR 212c of FIG. 2 if the frequency of TOD oscillator 222 of FIG. 2 is fast enough to meet the precision requirements of the software, and is slow enough to be sampled by the processor clock. Alternatively, TOD oscillator 222 of FIG. 2 could be used to clock TB SPR 212c of FIG. 2, with an asynchronous boundary implemented in the logic to access TB SPR 212c of FIG. 2. Regardless of the specific implementation, the net result is that the value of the 64-bit TB SPR 212c of FIG. 2 value is not a fixed multiple of processor cycles if the processor frequency is varied.

In order for a program executing on a thread to determine the portion of the processor resource allocated to it by accessing only TB SPR 212c of FIG. 2 and its own PURR SPR 212a or 212b of FIG. 2, it must be true that the sum of the PURR SPR 212a and 212b of FIG. 2 values across all threads must equal the TB SPR 212c of FIG. 2 value multiplied by a constant. Because the value of TB SPR 212c of FIG. 2 is not dependent on the number of processor cycles, the value of PURR SPR 212a and 212b of FIG. 2 also cannot be dependent on the number of processor cycles as it was in prior designs.

To preserve the required relationship between the PURR and TB values, PURR SPR 212a and 212b of FIG. 2 should be updated in conjunction with TB SPR 212c of FIG. 2. The utilization "charge" should be periodically sampled and accumulated to PURR SPR 212a and 212b of FIG. 2, where the sampling is relative to processor frequency-independent TOD oscillator 222 of FIG. 2 rather than counting processor cycles. A straight-forward approach is to sample and accumulate the utilization charge whenever TB bit (59) is updated by TOD oscillator 222 of FIG. 2. However, statistical accuracy improves as the sample rate increases, so we chose to sample and accumulate the utilization charge whenever TB bit (60) is updated.

Because TB bits (60:63) are incremented by a counter which counts processor cycles, they are not completely independent of processor frequency. However, since they saturate at '1111'b, and always clear on rising edge of TOD oscillator 306, if the range of processor frequency variation is limited such that it guarantees that TB bits (60:63) reach a value of at least '1000' between rising edges of TOD oscillator 306, it thus guarantees that TB bit (60) will change exactly twice for every increment of TB bits (0:59). Therefore the required constant relationship between TB SPR 212c of FIG. 2 and PURR SPR 212a and 212b of FIG. 2 is preserved.

Because in the preferred embodiment of the present invention described herein, instructions from both threads may be dispatched on the same processor cycle, the "charge" calculated for a sample must account for the portion of the resources allocated to each thread. It is not adequate to simply count how many cycles had instructions dispatched for each thread.

The value of PURR SPR 212a or 212b of FIG. 2 is normalized so that 1 unit of dispatch charge is associated with bit (60) of 64-bit PURR SPR 212a or 212b of FIG. 2, the low-order bits (61:63) are the fraction. The charge for a sampled dispatch cycle is represented as a 4-bit value for each thread, where the high order bit represents 1 unit of charge and the low order 3 bits represents a fraction with a granularity of ⅛ (0.0125), and the binary sum of the charge for both threads equals one unit of charge, or '1000'b. The dispatch charge calculation is as follows:

Dx=number of instructions in the sample dispatched for thread x.
If D0 or D1>0
  Thread 0 charge=D0/(D0+D1)
  Thread 1 charge=D1/(D0+D1)
If D0=D1=0
  Thread 0 charge=same as prior sample
  Thread 1 charge=same as prior sample In a preferred embodiment of the present invention, up to seven total instructions may be dispatched the same cycle, with up to five instructions from the same thread. With reference now to FIG. 4, a table showing all possible combinations of instruction dispatch combinations and the associated charge calculation in accordance with a preferred embodiment of the present invention is shown. In particular, FIG. 4 shows all possible combinations of instruction dispatch combinations and the associated charge calculation, wherein D0 and D1 are represented in decimal and the charge values are represented in binary.

The 4-bit dispatch charge value is added to the PURR value whenever TB bit (60) changes. Sampling of the dispatch information must be unbiased towards any thread, and must be performed at an equal or faster rate than TB bit (60) changes. To maintain the required mathematical relationship between PURR SPR 212a and 212b of FIG. 2 and TB SPR 212c of FIG. 2, the range of dynamic frequency variation must be limited such that TB bit (60) changes exactly twice for every increment of TB bits (0:59).

Figure 5:
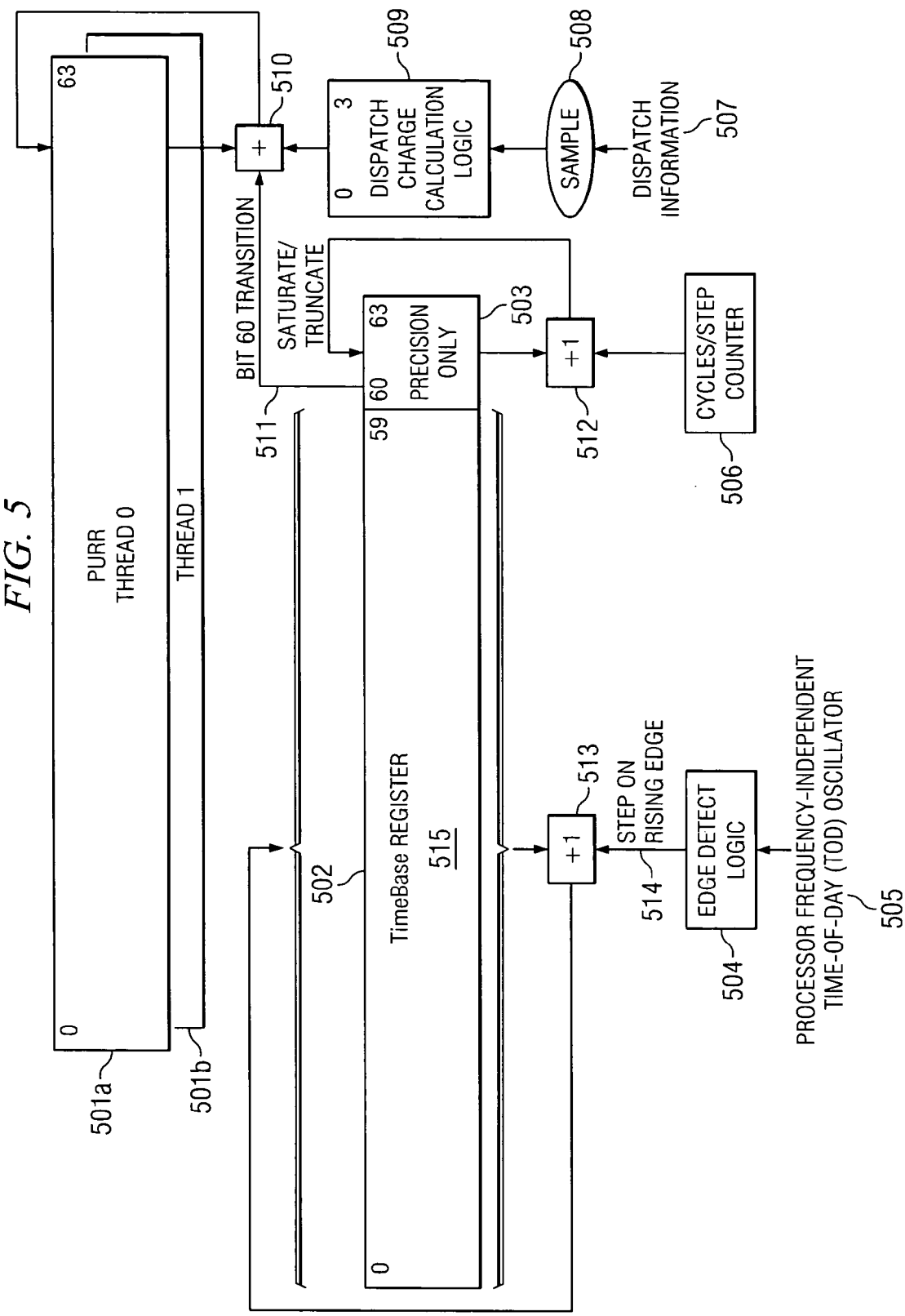
FIG. 5 is an exemplary illustration of Processor Utilization Resource Register (PURR) Sampling and TB interaction in accordance with a preferred embodiment of the present invention.

Referring to FIG. 5, an exemplary illustration of PURR SPR 212a and 212b of FIG. 2 sampling and TB SPR 212c of FIG. 2 interaction in accordance with a preferred embodiment of the present invention is shown. Cycles per step counter 506 indicates when to increment TB Register bits (60:63) 503 by counting a predetermined number of processor cycles. Edge detection logic 504 detects the rising edge of processor frequency independent TOD oscillator 505. Rising edge 514 of TOD oscillator 505 is used to increment 513 TB bits (0:59) 502. At faster processor frequencies, incrementer 512 for TB bits (60:63) 503 saturate at a maximum hexadecimal value 'F'x until TB bits (0:59) 502 are incremented by rising edge 514 of TOD oscillator 505. At slower processor frequencies, incrementer 512 for TB bits (60:63) 503 truncate when TB bits (0:59) 502 are incremented from rising edge 514 of TOD oscillator 505.

Sample 508 of Instruction Dispatch Information 507 is provided to Dispatch Charge Calculation Logic 509. Dispatch Charge Calculation Logic 509 determines the 4-bit charge value which represents the fraction of dispatch capacity allocated to each thread by utilizing the dispatch charge calculation formula found on page 24 above. On every transition of TB bit (60) 511 the 4-bit charge value from Dispatch Charge Calculation Logic 509 is added 510 to PURR 501a and 501b for each thread.

Figure 6:
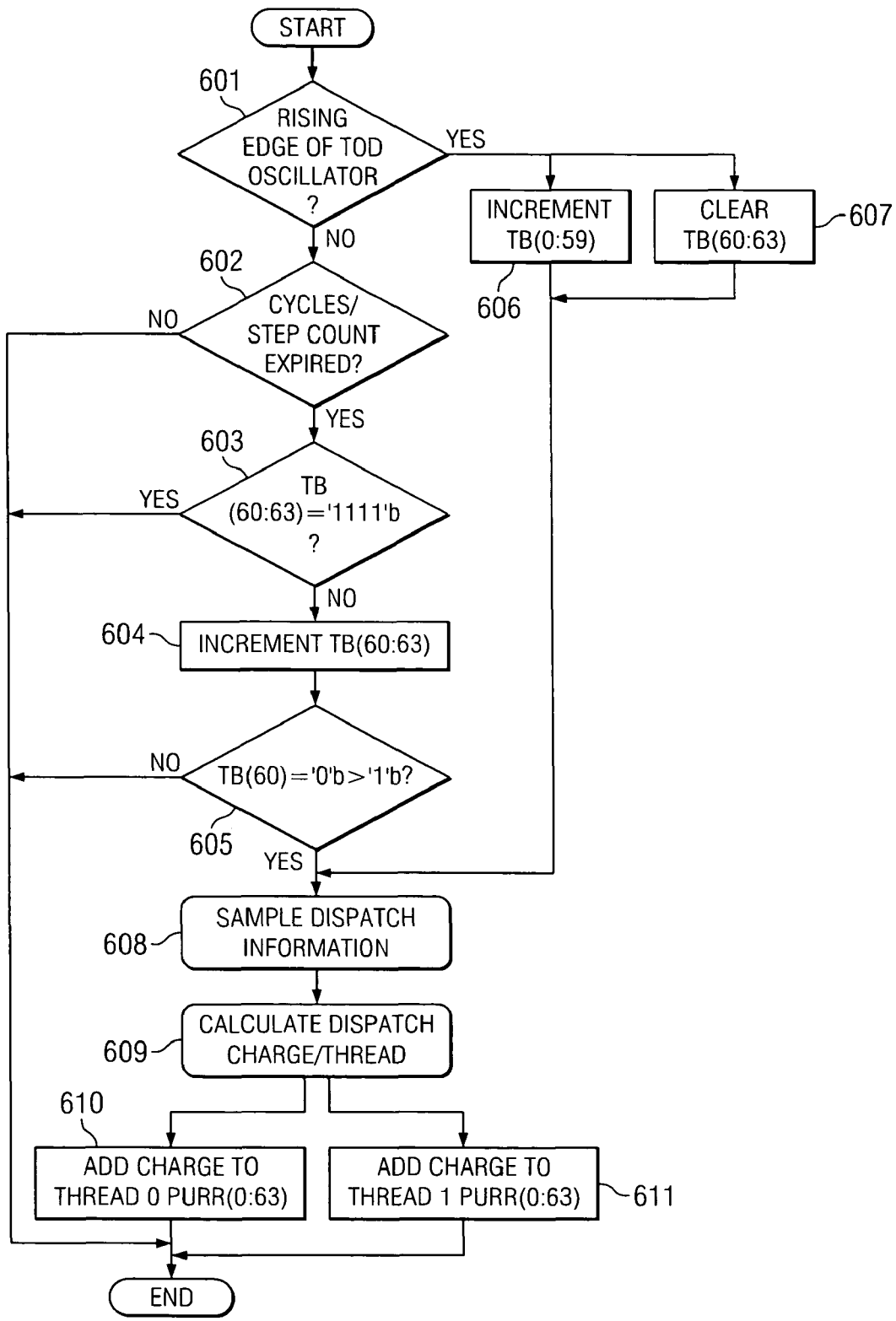
FIG. 6 is a flowchart illustrating a method for sampling the dispatch charge for each thread to measure the portion of useful capacity allocated to each thread in a dual-threaded SMT processor in accordance with a preferred embodiment of the present invention.

With reference now to FIG. 6, a flowchart illustrating a method for sampling the dispatch charge for each thread to measure the portion of useful capacity allocated to each thread in a dual-threaded SMT processor in accordance with a preferred embodiment of the present invention is shown. More specifically, FIG. 6 is a flowchart outlining the sequence of FIG. 5 for PURR 501a and 501b in FIG. 5 sampling and TB 515 in FIG. 5 interaction in accordance with a preferred embodiment of the present invention. In particular, FIG. 6 is a flowchart which illustrates the sequence of steps evaluated each cycle.

The process begins with a determination whether there is a rising edge of the TOD oscillator (Step 601). In this example, the TOD oscillator may be implemented as TOD oscillator 505 in FIG. 5. If there is no rising edge of the TOD oscillator (no output of Step 601), then a determination is made whether the cycles per step count (for example, cycles/step counter 506 in FIG. 5) has expired (Step 602). If the cycles per step count have not expired, then the process terminates thereafter. If the cycles per step count have expired, then a determination is made whether TB bits (60:63) (for example, TB bits (60:63) 503 in FIG. 5) are saturated at the maximum value of '1111'b (Step 603). If TB bits (60:63) are saturated at '1111'b, then the process terminates thereafter (TB bits (60:63) are unchanged). If TB bits (60:63) are not saturated at '1111'b, then TB bits (60:63) are incremented (Step 604).

Following the incrementing of TB bits (60:63) (Step 604), a determination is made whether TB bit (60) changes from 0 to 1 (Step 605) (for example, TB bit 60 transition 511 in FIG. 5). If TB bit (60) does not change from 0 to 1, then the process terminates thereafter. If TB bit (60) does change from 0 to 1, then the process continues at Step 608.

Turning back to Step 601, if there is a rising edge of the TOD oscillator (Yes output of Step 601), then TB bits (0:59) are incremented (Step 606) (for example, TB bits (0:59) 502 in FIG. 5) and TB bits (60:63) are cleared (Step 607) at the same time. Note that clearing TB bits (60:63) (Step 607) results in a transition of TB bit (60) from 1 to 0 (not shown in this figure). After TB bits (0:59) are incremented (Step 606) and TB bits (60:63) are cleared, the process continues to Step 608.

At Step 608, the sampled dispatch information (for example, sample dispatch information 508 in FIG. 5) is used to calculate dispatch charge per thread (Step 609) (for example, 509 in FIG. 5), and calculated dispatch charge (Step 609) is added to thread-0 PURR bits (0:63) (Step 610) and to thread-1 PURR bits (0:63) (Step 611) (for example, thread-0 PURR bits (0:63) 501a and thread-1 PURR bits (0:63) 501b in FIG. 5). The process terminates thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a simultaneously multi-threading (SMT) data processing system with a dynamic variation of processor frequency for accurately measuring useful capacity of a processor allocated to each thread, the method comprising the steps of:
   dispatching instructions from multiple threads executing by the processor on a same clock cycle;
   determining if a rising edge of a processor frequency independent Time-of-Day (TOD) oscillator is present;
   determining if a cycles per step count is expired; and
   determining if Time Base (TB) register bits (60:63) are saturated at a maximum value of '1111'b.

2. The method of claim 1, further comprising:
   responsive to determining that a cycles per step count is expired and that TB bits (60:63) are not saturated at the maximum value of '1111'b, incrementing TB bits (60:63); and
   determining if TB bit (60) changes from 0 to 1.

3. The method of claim 1, further comprising:
   responsive to determining that the rising edge of the TOD oscillator is present, incrementing TB bits (0:59); and
   clearing TB bits (60:63), wherein the incrementing step and the clearing step are performed at a same time.

4. The method of claim 1, further comprising:
   sampling a thread dispatch charge information, wherein the dispatch instructions from multiple threads executing by the processor on a same clock cycle include a number of instructions for one of a thread-0 and a thread-1;
   calculating a dispatch charge for each thread;
   adding the calculated dispatch charge to thread-0 Processor Utilization Resource Register (PURR) bits (0:63) and thread-1 PURR bits (0:63).

5. The method of claim 4, wherein the adding step is performed responsive to one of determining that TB bit (60) changes from 0 to 1 and clearing TB bits (60:63).

6. The method of claim 4, wherein the calculating step comprises:
   if the number of instructions in the sampled dispatch information for thread-0 is greater than zero, setting a thread charge for thread-0 equals to the number of instructions for thread-0 divided by a total number of instructions for thread-0 and thread-1;
   if the number of instructions in the sampled dispatch information for thread-1 is greater than zero, setting a thread charge for thread-1 equals to the number of instructions for thread-1 divided by a total number of instructions for thread-0 and thread-1; and
   if the number of instructions in the sampled dispatch information for thread-0 and the number of instructions in the sampled dispatch information for thread-1 is equal to zero, setting a charge for the thread-0 and the thread-1 equals to a sampled charge of a prior cycle.

7. The method of claim 1, wherein the data processing system comprises one or more dual-threaded processors.

8. A simultaneously multi-threading (SMT) data processing system with a dynamic variation of processor frequency comprising:
   a processor for dispatching instructions from multiple threads on a same clock cycle, wherein the processor executes instructions for determining if a cycles per step count is expired and for determining if TB bits (60:63) are saturated at a maximum value of '1111'b; and an edge detection logic for determining if a rising edge of a processor frequency independent Time-of-Day (TOD) oscillator is present.

9. The SMT data processing system of claim 8, further comprising:

a first incrementer for incrementing TB bits (60:63) and wherein the processor further executes instructions for determining if TB bit (60) changes from 0 to 1, responsive to determining that a cycles per step count is expired and that TB bits (60:63) are not saturated at the maximum value of '1111'b.

10. The SMT data processing system of claim 8, further comprising:

a second incrementer for incrementing TB bits (0:59) and the processor executes further instructions for clearing TB bits (60:63), responsive to determining that the rising edge of the TOD oscillator is present, wherein the incrementing step and the clearing step are performed at a same time.

11. The SMT data processing system of claim 8, further comprising:

the processor further executes instructions for sampling a thread dispatch charge information, wherein the instructions dispatched from multiple threads are executed by the processor on a same clock cycle include a number of instructions for one of a thread-0 and a thread-1;

a dispatch charge calculation logic for calculating a dispatch charge for each thread; and an adder for adding the calculated dispatch charge to thread-0 Processor Utilization Resource Register (PURR) bits (0:63) and thread-1 PURR bits (0:63).

12. The SMT data processing system of claim 11, wherein the adder for performing the addition is responsive to one of determining that TB bit (60) changes from 0 to 1 and clearing TB bits (60:63).

13. The SMT data processing system of claim 11, wherein the dispatch charge calculation logic calculates a dispatch charge for each thread utilizing a dispatch charge calculation formula, wherein the dispatch charge calculation formula:

sets a thread charge for thread-0 equals to the number of instructions for thread-0 divided by a total number of instructions for thread-0 and thread-1 if the number of instructions in the sampled dispatch information for thread-0 is greater than zero;

sets a thread charge for thread-1 equals to the number of instructions for thread-1 divided by a total number of instructions for thread-0 and thread-1 if the number of instructions in the sampled dispatch information for thread-1 is greater than zero; and sets a charge for the thread-0 and the thread-1 equals to a sampled charge of a prior cycle if the number of instructions in the sampled dispatch information for thread-0 and the number of instructions in the sampled dispatch information for thread-1 is equal to zero.

14. The SMT data processing system of claim 8, wherein the data processing system comprises a dual-threaded processing system.

15. The SMT data processing system of claim 8, wherein the processor comprises one of a plurality of processors.

16. A computer program product stored in a computer readable non transitory medium in a simultaneously multi-threading (SMT) data processing system with a dynamic variation of processor frequency for accurately measuring useful capacity of a processor allocated to each thread, the computer program product comprising:

first instructions for dispatching instructions from multiple threads executing by the processor on a same clock cycle;

second instructions for determining if a rising edge of a processor frequency independent Time-of-Day (TOD) oscillator is present;

third instructions for determining if a cycles per step count is expired; and fourth instructions for determining if Time Base (TB) register bits (60:63) are saturated at a maximum value of '1111'b.

17. The computer program product as recited in claim 16, further comprising:

fifth instructions for incrementing TB bits (60:63), responsive to determining that a cycles per step count is expired and that TB bits (60:63) are not saturated at the maximum value of '1111'b; and sixth instructions for determining if TB bit (60) changes from 0 to 1.

18. The computer program product as recited in claim 16, further comprising:

seventh instructions for incrementing TB bits (0:59), responsive to determining that the rising edge of the TOD oscillator is present; and eighth instructions for clearing TB bits (60:63), wherein the seventh instructions and the eighth instructions are performed at a same time.

19. The computer program product as recited in claim 16, further comprising:

ninth instructions for sampling a thread dispatch charge information, wherein the dispatch instructions from multiple threads executing by the processor on a same clock cycle include a number of instructions for one of a thread-0 and a thread-1;

tenth instructions for calculating a dispatch charge for each thread; and eleventh instructions for adding the calculated dispatch charge to thread-0 Processor Utilization Resource Register (PURR) bits (0:63) and thread-1 PURR bits (0:63).

20. The computer program product as recited in claim 19, wherein the eleventh instructions is performed responsive to one of determining that TB bit (60) changes from 0 to 1 and clearing TB bits (60:63).

21. The computer program product as recited in claim 19, wherein the tenth instructions comprises:

first sub-instructions for setting a thread charge for thread-0 equals to the number of instructions for thread-0 divided by a total number of instructions for thread-0 and thread-1 if the number of instructions in the sampled dispatch information for thread-0 is greater than zero;

second sub-instructions for setting a thread charge for thread-1 equals to the number of instructions for thread-1 divided by a total number of instructions for thread-0 and thread-1 if the number of instructions in the sampled dispatch information for thread-1 is greater than zero; and third sub-instructions for setting a charge for the thread-0 and the thread-1 equals to a sampled charge of a prior cycle if the number of instructions in the sampled dispatch information for thread-0 and the number of instructions in the sampled dispatch information for thread-1 is equal to zero.

* * * * *